US006853974B1

(12) United States Patent
Akifuji et al.

(10) Patent No.: US 6,853,974 B1
(45) Date of Patent: Feb. 8, 2005

(54) WORKFLOW SYSTEM, WORKFLOW CONTROL METHOD AND STORAGE MEDIUM

(75) Inventors: Shunsuke Akifuji, Wako (JP); Toshiaki Sakaguchi, Kawasaki (JP); Yoko Seki, Kawasaki (JP); Masato Tamaki, Zushi (JP); Atsushi Aoki, Yokohama (JP); Yoshiki Matsuda, Minato-ku (JP); Osamu Tosaka, Yokohama (JP); Shigeki Ishihara, Chigasaki (JP)

(73) Assignees: Hitachi, Ltd., Tokyo (JP); Hitachi Software Engineering Co, Ltd., Kanagawa-ken (JP)

( * ) Notice: Subject to any disclaimer, the term of this patent is extended or adjusted under 35 U.S.C. 154(b) by 0 days.

(21) Appl. No.: 09/377,402

(22) Filed: Aug. 20, 1999

(30) Foreign Application Priority Data

Aug. 24, 1998 (JP) .......................................... 10-237628

(51) Int. Cl.[7] .............................................. G06F 17/60

(52) U.S. Cl. .......................................... 705/9; 709/223

(58) Field of Search .................... 705/8, 9, 7; 709/223, 709/224

(56) References Cited

U.S. PATENT DOCUMENTS

| 5,721,913 | A | | 2/1998 | Ackroff et al. |
| 5,768,506 | A | | 6/1998 | Randell |
| 5,826,020 | A | * | 10/1998 | Randell ...................... 709/202 |
| 5,870,545 | A | * | 2/1999 | Davis et al. ................. 709/201 |
| 5,892,449 | A | * | 4/1999 | Reid et al. ................... 340/639 |
| 6,073,109 | A | * | 6/2000 | Flores et al. .................... 705/8 |
| 6,115,646 | A | * | 9/2000 | Fiszman et al. ............. 700/181 |
| 6,151,583 | A | * | 11/2000 | Ohmura et al. ................. 705/8 |
| 6,275,809 | B1 | * | 8/2001 | Tamaki et al. .................. 705/8 |
| 6,401,119 | B1 | * | 6/2002 | Fuss et al. ................... 709/224 |

FOREIGN PATENT DOCUMENTS

EP       0807 896 A2   11/1997

OTHER PUBLICATIONS

"ICS Continuity V3.0 for End–to–End Service Management in Distributed IT Infrastructures." Business Wire, Apr. 13, 1998.*
"Cabletron's SPECTRUM Heightens Customer Control Over Enterprise Networks and Applications." Business Wire, Apr. 13, 1998.*
"Interworkflow Application Model: The Design of Cross–Organizational Workflow Processes and Distributed Operations Management." The Workflow Management Coalition Specification, Submitted to WfMC as Document WFMC–TC–2102, Feb. 1997.*
Alonso, G., Agrawal, D. Abbadi, A. El, Kamath, M., Gunthor, R., Mohan, C.; "Advanced Transaction Models in Workflow Contexts"; 1996 IEEE.
Hollingsworth, David; "Workflow Management Coalition The Workflow Reference Model"; Document No. TC00–1003; Jan. 19, 1995.

* cited by examiner

*Primary Examiner*—Susanna M. Diaz
(74) *Attorney, Agent, or Firm*—Antonelli, Terry, Stout & Kraus, LLP

(57) ABSTRACT

In a workflow system capable of simultaneously executing a plurality of business processes, an exception handling unit extracts an exception condition from a business status definition table and transfers the exception condition to a status watcher, the status watcher refers to data contained in an application data base and, when there is a change meeting a predetermined exception condition, transfers the change to a user retrieval unit, the user retrieval unit refers to a working data base to retrieve a user and gives information to the computer of the related user, whereby, when one of interdependent business processes is discontinued, information that the business process is discontinued is given to the computers executing the other interdependent business processes.

18 Claims, 13 Drawing Sheets

FIG. 2

APPLICATION DATA BASE 80

| BUSINESS ID NO. | ... | START OF ESTIMATION | COMPLETION OF ESTIMATION | ... |
|---|---|---|---|---|
| 001 | | | | |
| | | | | |
| | | | | |
| | | | | |

BUSINESS STATUS DEFINITION TABLE 10

| BUSINESS STATUS NAME | STATUS | BUSINESS ID NO. | START OF ESTIMATION | COMPLETION OF ESTIMATION | |
|---|---|---|---|---|---|
| INQUIRY | START | ENTERED | NULL | | |
| | COMPLETION | | ENTERED | | |
| ESTIMATION | START | ENTERED | | NULL | |
| | COMPLETION | | | ENTERED | |
| | | | | | |

ACTION/DIVISION DEFINITION TABLE 20

| BUSINESS STATUS NAME | ACTION NAME | BUSINESS PROCESSING STEP | DIVISION NODE |
|---|---|---|---|
| (INQUIRY) | CREATION OF INQUIRY DOCUMENT | INQUIRY | (SALES) |
| (ESTIMATION) | | ESTIMATION | (SALES) |
| | | | |

Column headers: 4010, 4020, 4030, 4040
Row labels: 4100, 4110

FIG. 5

ORGANIZATION DATA BASE 30

| DIVISION NODE | ORGANIZATIONAL STRUCTURE |
|---|---|
| (SALES) | (DIRECT RETAIL SALES DEPT.) — (SALES SECTION 1)<br>(WHOLESALE DEPT.) — (SALES SECTION 2)<br>(SALES SECTION 3) |
| (DESIGN) | |

Column headers: 5010, 5020
Row labels: 5100, 5110

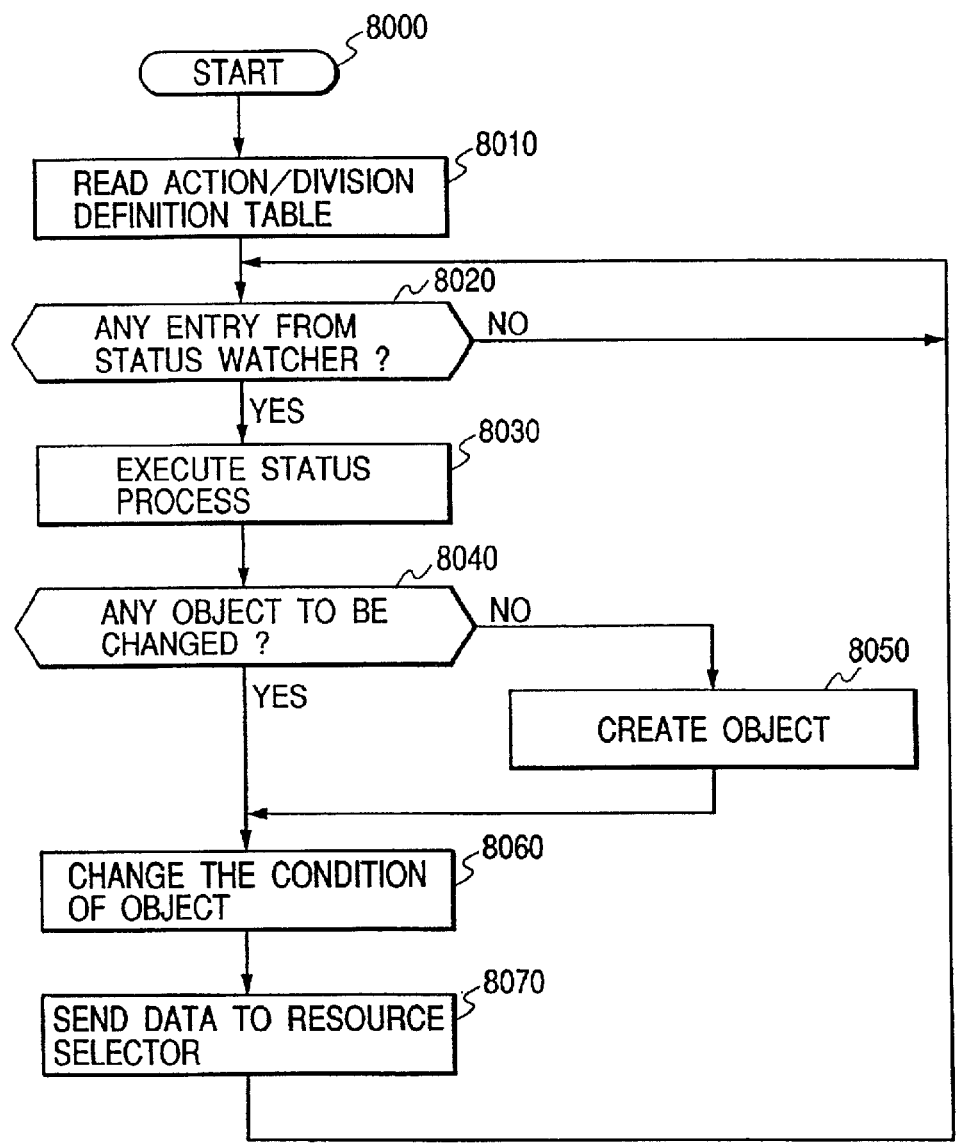

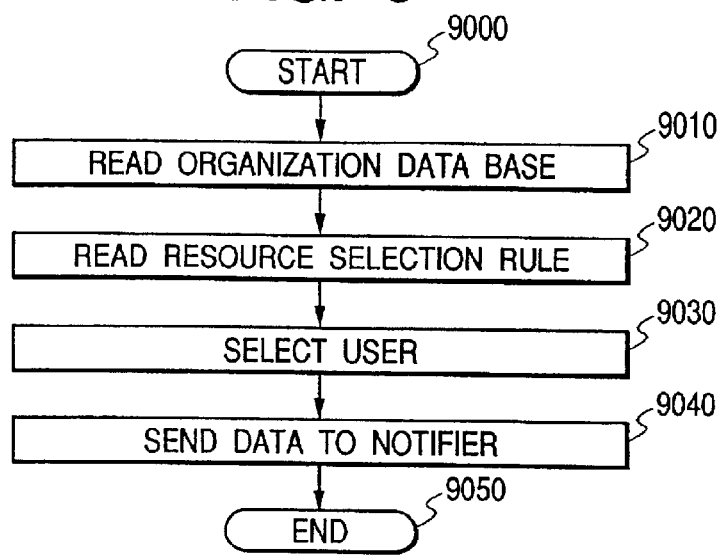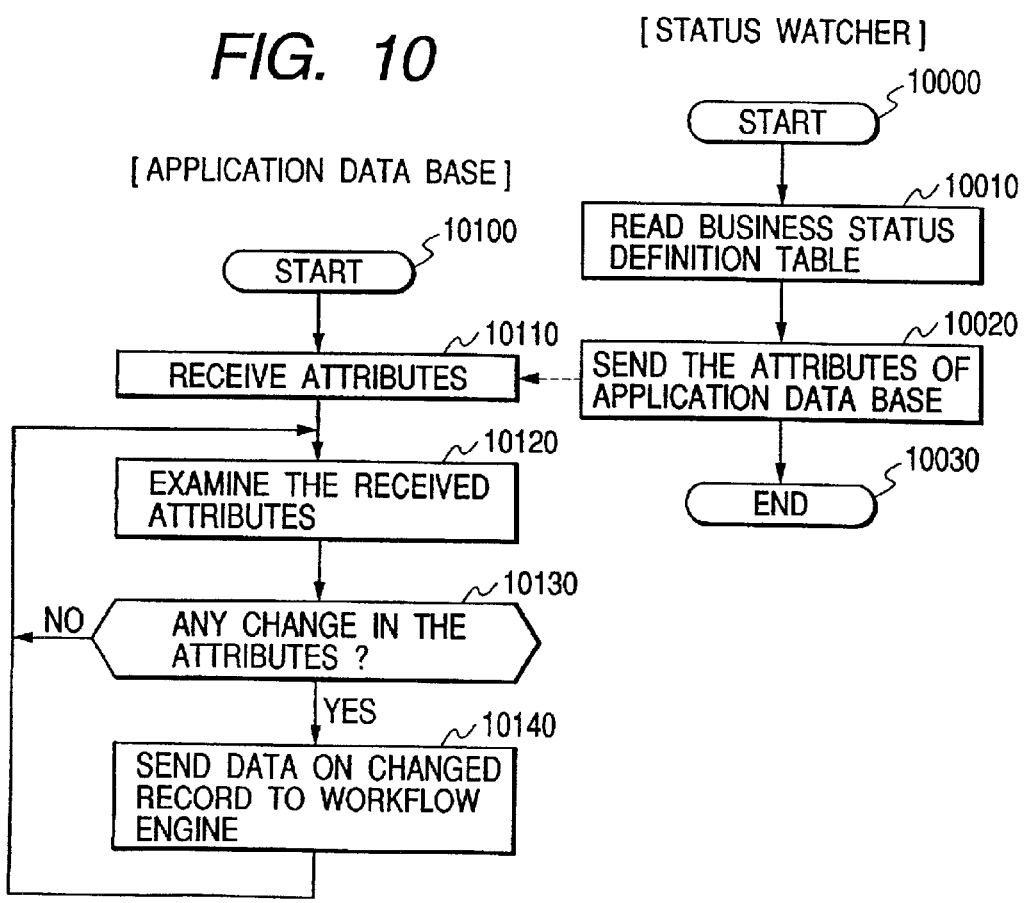

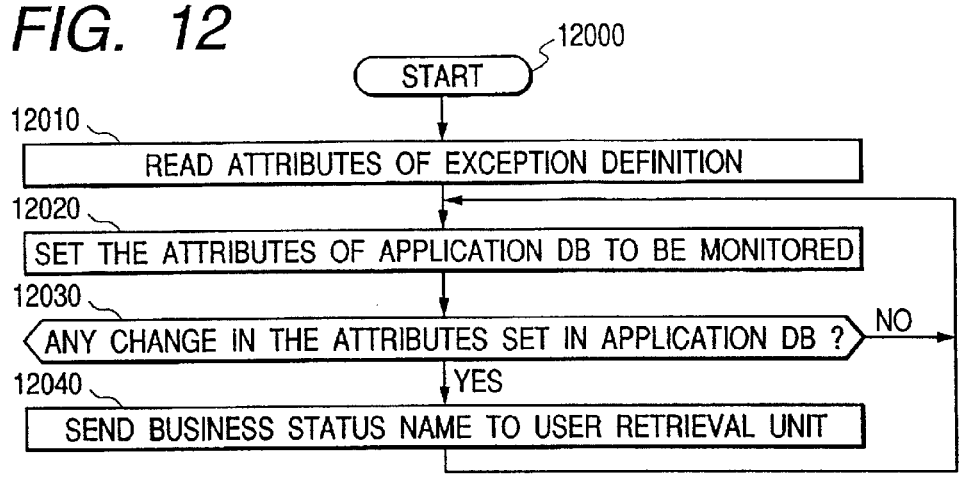

FIG. 16

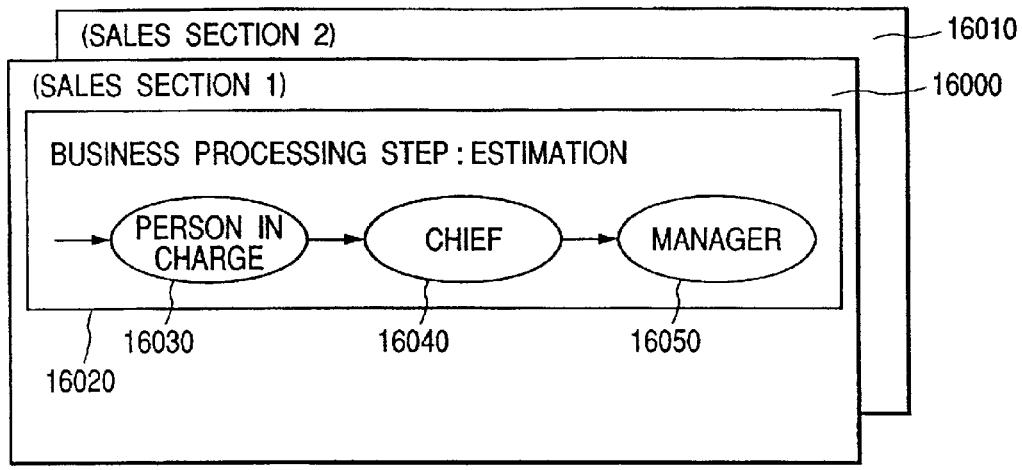

BUSINESS PROCESS FLOW DEFINITION 15000

FIG. 17

RESOURCE SELECTION RULE 15010

| DIVISION NODE: SALES SECTION 2 | | | 17010 |
| DIVISION NODE: SALES SECTION 1 | | | 170000 |

BUSINESS PROCESSING STEP: ESTIMATION

| POSITION | RESOURCE SELECTION CONDITION | NAME OF PERSON |
|---|---|---|
| PERSON IN CHARGE | ESTIMATION FOR CUSTOMER 1 | A |
|  | ESTIMATION FOR CUSTOMER 2 | B |
| CHIEF |  |  |
| MANAGER |  |  |

17030 — POSITION
17040 — RESOURCE SELECTION CONDITION
17050 — NAME OF PERSON
17060 — PERSON IN CHARGE
17020 — MANAGER

WORKFLOW SYSTEM, WORKFLOW CONTROL METHOD AND STORAGE MEDIUM

BACKGROUND OF THE INVENTION

1. Field of the Invention

The present invention relates to a workflow management system for controlling order of execution of business programs.

2. Description of the Related Art

Various methods employing a computer have been proposed to enhance the efficiency of business work to be carried out by a group. A workflow management system which carries out one of the previously proposed methods converts documents including slips into electronic documents, and circulates the electronic document among users in conformity to predetermined rules. The conception of workflow management systems of this kind is mentioned in, for example, Syunsuke Akifuji, Hirotoshi Ise and Hiroshi Majima, "Trend of Workflow Management Systems", Shisutemu/Seigyo/Jouhou, Vol. 40, No. 5, pp. 203–208 (May, 1996). Generally, a workflow control system creates a business flow (workflow) specifying a business procedure by using a graphical user interface including icons and arrows, a workflow engine, i.e., a program, interprets the business flow and instruct the user to process the electronic documents.

A technique relating to a workflow management system is disclosed in, for example, Japanese Unexamined Patent Publication No. Hei 8-36538. This related art technique relates to a workflow management system for the joint management of business processes executed by a plurality of information processors interconnected by a network on the basis of a predetermined workflow. The workflow management system comprises a communication managing means for collectively managing communication processes for communication between persons performed by the persons for instruction and inquiry about the contents of business processes to execute a plurality of related business processes assigned to those persons.

When a first person to whom a first business process is assigned executes an operation for instruction and inquiry about the contents of a second business process, the communication managing means retrieves automatically a second person to whom the second business process is assigned, and then starts a communication process for communication between the first and the second person.

Generally, business processes are not executed one by one and, in most cases, a plurality of related business processes are executed simultaneously to reduce overall business time. For instance, in a business flow from the reception of an order for merchandise to the delivery of the merchandise, an estimate is made for the merchandise after the completion of inquiry and then the production of the merchandise is started. Actually, it is possible that estimation is stated during inquiry to start production at an early stage.

When one of a plurality of interdependent business processes is discontinued while the interdependent business processes are being executed simultaneously by this prior art workflow management system, users involved in the rest of the business processes are unable to know the discontinuance of the business process and carry out the unnecessary business processes uselessly unless the users are notified of the discontinuance of the business process.

SUMMARY OF THE INVENTION

It is an object of the present invention to provide a workflow management system capable of notifying users carrying out a plurality of interdependent business processes of the discontinuance of one of the plurality of interdependent business processes during the simultaneous execution of the plurality of interdependent business processes.

According to a first aspect of the present invention, a workflow management system for controlling order of execution of business programs comprises: a status watcher which refers to data included in an application data base storing data on application programs and detects a change meeting preset conditions; a workflow engine which refers to data provided by the status watcher, a working data base and an action/division definition table describing rules of transition of status of previously described work data base and changes the status of working data base; a resource selector which refers to data provided by the workflow engine, a resource selection rule describing the relation between preset work and users and the working data base, and selects a user; and a notifier which notifies a user selected by the resource selector of work.

According a second aspect of the present invention, a workflow management system for controlling order of executing business programs comprises: a status watcher which refers to data included in an application data base storing data on application programs, and detects a change meeting preset conditions; a first workflow engine which refers to data provided by the status watcher, a working data base and an action/division definition table describing rules of transition of status of previously described work data base, and changes the status of working database; a first resource selector which refers to a business process flow definition describing the relation between an organization (a group of uses) and a process to be carried out by the organization, and a working data base and selects a process; a sub-process executor which starts a process selected by the first resource selector; a second workflow engine which refers to an application data base and a previously provided status transition description, and changes the status of working data base; a second resource selector which refers to a user selection rule describing the relation between preset work and users, and working data base and selects a user; and a notifier which notifies the user selected by the second resource selector of work.

In the foregoing workflow management system, it is preferable to make reference to the application data base and, if a change meeting a preset exception condition is found, to notify the user of the change.

In this workflow management system, it is preferable that the exception condition indicates the discontinuance of a first business status and the start of a second business status having the same start condition as that of the first business status. The exception condition may indicate the discontinuance of a first business status, the termination of a second business status, and the start of a third business status started after the termination of the second business status.

BRIEF DESCRIPTION OF THE DRAWINGS

FIG. 2 is a view for explaining the detail of an application data base included in the first embodiment;

FIG. 3 is a view for explaining the detail of a business status definition table included in the first embodiment;

FIG. 4 is a view for explaining the detail of an action/division definition table included in the first embodiment;

FIG. 5 is a view for explaining the detail of an organization data base included in the first embodiment;

FIG. 8 is a flow chart for explaining the operation of a workflow engine;

FIG. 9 is a flow chart for explaining the operation of a resource selector;

FIG. 10 is a flow chart for explaining the operations of a status watcher and an application data base when the status watcher receives notice of change from the application data base;

FIG. 12 is a flow chart for explaining the operation of an exception status watcher;

FIG. 13 is a view of a business status definition table for explaining the creation of an exception condition;

FIG. 14 is a view of a business status definition table for explaining another example of creation of an exception condition;

FIG. 16 is a view for explaining the detail of a business process flow definition;

FIG. 17 is a view for explaining the detail of a resource selection rule;

DESCRIPTION OF THE PREFERRED EMBODIMENTS

Workflow management system in preferred embodiments according to the present invention will be described hereinafter with reference to the accompanying drawings.

Figure 1:
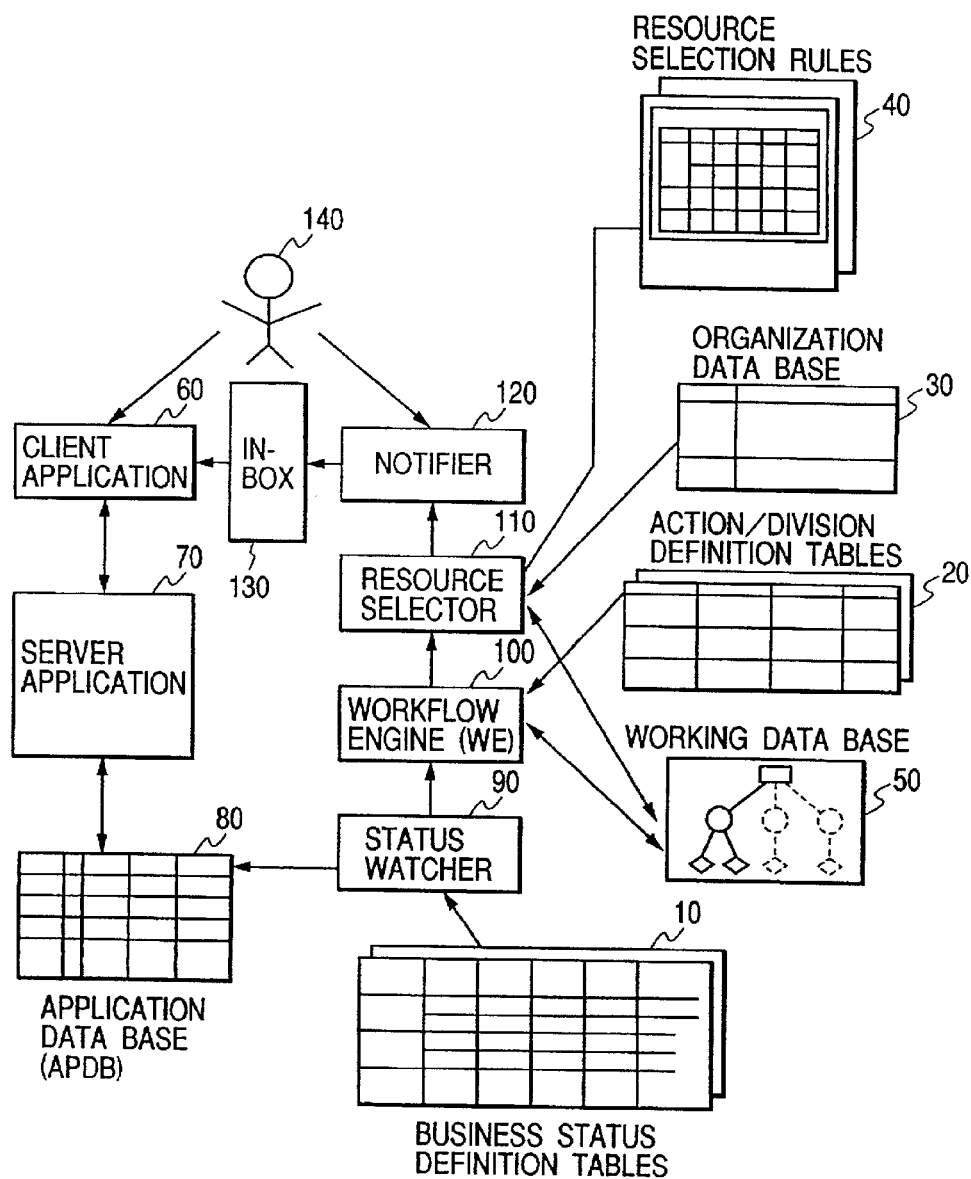
FIG. 1 is a block diagram of a workflow management system in a first embodiment according to the present invention.
Figure 6:
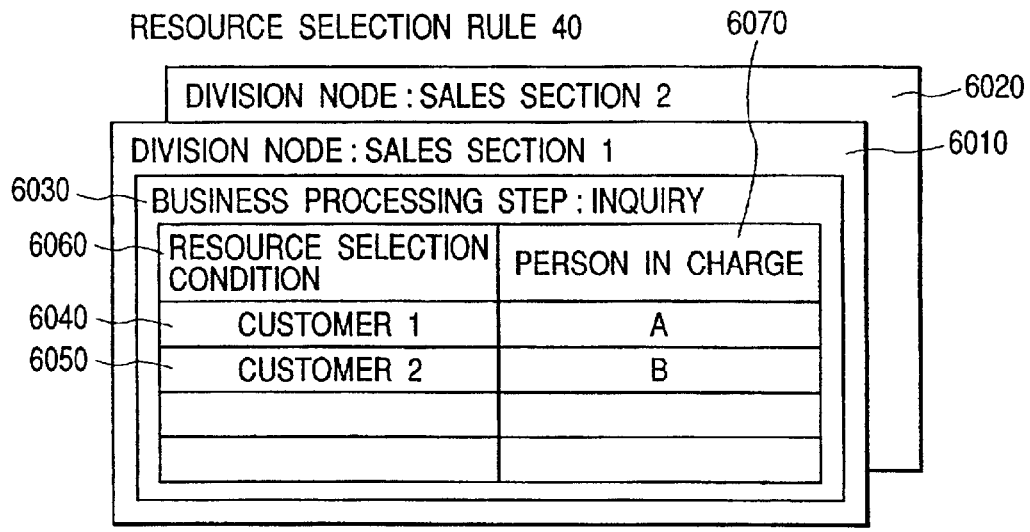
FIG. 6 is a view for explaining the detail of a resource selection rule included in the first embodiment.
Figure 7:
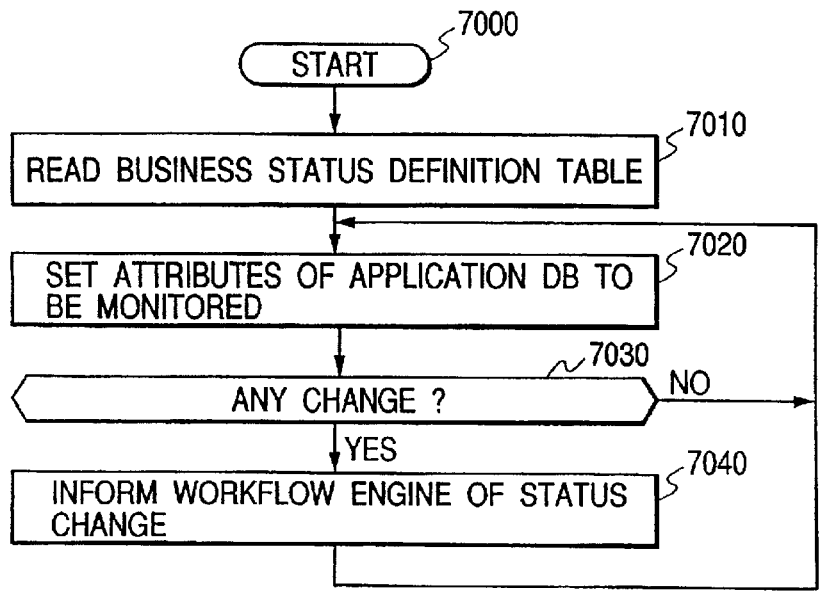
FIG. 7 is a flow chart for explaining the operation of a status watcher.

FIG. 1 is a block diagram of a workflow management system in a first embodiment according to the present invention, FIG. 2 is a view for explaining the detail of an application data base, FIG. 3 is a view for explaining the detail of a business status definition table, FIG. 4 is a view for explaining the detail of an action/division definition table, FIG. 5 is a view for explaining the detail of an organization data base, FIG. 6 is a view for explaining the detail of a resource selection rule, FIG. 7 is a flow chart for explaining the operation of a status watcher, FIG. 8 is a flow chart for explaining the operation of a workflow engine, and FIG. 9 is a flow chart for explaining the operation of a resource selector.

In FIGS. 1 to 6, a numeral 10 indicates a business status definition table, 20 an action/division definition table, 30 an organization data base, 40 a resource selection rule, 50 a working data base, 60 an client application, 70 a server application, 80 an application data base, 90 a status watcher, 100 a workflow engine, 110 a resource selector, 120 a notifier, 130 an in-box and 140 a user.

The workflow management system in the first embodiment according to the present invention is characterized in referring to data stored in an application data base other than the data base of the workflow management system and controlling the existing application program.

As shown in FIG. 1, the workflow management system in the first embodiment comprises the business status definition tables 10 describing business statuses and the corresponding attributes, the action/division definition tables 20 specifying correspondence between business statuses and actions, and business processing steps and divisions, the organization data base 30 specifying the relation between divisions and the organization, the resource selection rule 40 specifying the relation among a combination of division and business processing step, a resource selecting condition, and persons in charge, the working data base 50 storing data for the workflow management system, the client application 60 to be executed by client computers, the server application 70 to be executed by a server computer for communicating with the client application 60, the application data base (APDB) 80 storing data for server application 70, the status watcher (SW) 90 which monitors change in the status of the application data base 80, the workflow engine 100 which refers to the output of the status watcher 90 and the data stored in the working data base 50 to change the contents of the working data base, the resource selector (RS) 110 which receives the output of the workflow engine 100, refers to the working data base 50, the action/division definition tables 20 and the organization data base 30 to select a user, the notifier 120 which gives the selected user a notice, and the in-box 130 which stores the notice given by the resource selector 120. The user 140 refers to the notice stored in the in-box 130 and executes the client application.

As shown in FIG. 2, the application data base 80 contains records 2100 each of which is corresponding to a business identification number and including attribute information items 2010, 2020 and 2030 representing business identification number, start of estimation and completion of estimation, respectively.

As shown in FIG. 3, the business status definition table 10 contains records 3100 and 3110 each of which is corresponding to a business identification number and including attribute information items 3010, 3020, 3030, 3040 and 3050 representing business status name, status, business identification number, start of estimation and completion of estimation, respectively.

As shown in FIG. 4, the action/division definition table 20 contains records 4100 and 4110 each of which is corresponding to a business identification number and including attribute information items 4010, 4020, 4030 and 4040 representing business status name, action name, business processing step and division node, respectively.

As shown in FIG. 5, the organization data base 30 contains records 5100 and 5110 each of which is corresponding to a division node and including attribute information items 5010 and 5020 representing division node and organization structure, respectively. An organization structure is expressed by a tree structure as shown in FIG. 5.

The resource selection rule 40 comprises division node resource selection rules 6010 and 6020 as shown in FIG. 6. The division node resource selection rule 6010 has a region 6030 for indicating business process step. The region 6030 is defining attribute information items 6060 and 6070 representing resource selection condition and name of person in charge, and two records 6040 and 6050 are prepared therein depending upon the resource selection conditions.

The operation of the workflow management system thus constructed will be described hereinafter. The processing in the workflow management system shown in FIG. 1 is executed by the status watcher 90, the workflow engine 100, the resource selector 110 and the notifier 120 which are individual programs operative in parallel. These programs can easily be realized by using functions, such as process execution and interprocess communication.

The operation of the status watcher 90 will be described with reference to a flow chart shown in FIG. 7.

(1) Upon the start of a procedure shown in FIG. 7, the status watcher 90 reads attribute names from the business status definition table 10 and sets attributes of application data base 80 to be monitored (steps 7000, 7010 and 7020).

(2) A query is made in step 7030 to see if any change is made in the attributes of the application data base 80. If the response in step 7030 is affirmative, the business status name and the status of the record are given to the workflow engine 100 in step 7040 (steps 7030 and 7040).

(3) If the response in step 7030 is negative or after the completion of step 7040, the procedure returns to step 7020, and steps 7020 to 7040 are repeated.

Data as shown in FIG. 3 is stored in the business status table 10 by this procedure. Attributes representing business identification number, start of estimation, completion of estimation are monitored. In the data given to the workflow engine 100, the business status is "start of inquiry" when a business identification is given and estimation is not started. When "start of estimation" is entered, the business status is "completion of inquiry". When the business identification number is given and "end of estimation" is not entered, the business status is "start of estimation". When "completion of estimation" is entered, the business status is "completion of estimation".

As shown in FIG. 2, the application data base 80 now stores therein a record 2100 having a business identification number "001" but no information about the start and completion of estimation. The record 2100 was written in the application data base 80 by the server application 70. Since the business identification number has been entered and any information about the start of estimation is not entered yet, the status watcher 90 gives the workflow engine 100 notice that the business status is "start of inquiry" in step 7040.

The operation of the workflow engine 100 will be described with reference to FIG. 8.

(1) The workflow engine 100 starts the procedure shown in FIG. 8 upon the reception of the notice for indicating the business status change issued by the status watcher 90 in step 7040. The workflow engine 100 reads all the records stored in the action/division definition table 20 (steps 8000 and 8010).

(2) A query is made in step 8020 to see if any information is received from the status watcher 90. If the response in step 8020 is negative, step 8020 is repeated. If the response in step 8020 is affirmative, the workflow engine 100 compares data received from the status watcher 90 with all the records read out from the action/division definition table 20 in step 8030 to determine a process to be executed (steps 8020 and 8030).

(3) A query is made in step 8040 to see if the process determined in step 8030 has any object to be changed. If the response in step 8040 is negative, a new object for storing working data is created in the working data base 50 (steps 8040 and 8050).

(4) After the completion of step 8050 or when the response in step 8040 is affirmative, i.e., when the business status is changed, the status of the object created in the working data base 50 is changed, action name, business process step and division node are given to the resource selector 110, and then steps 8020 to 8070 are repeated (steps 8060 and 8070).

In the above process, since the action/division definition 20 was read in step 8010, and the information was received from the status watcher 90, an object is created in the working data base 50 in step 8050, the data is set in step 8060, and the data is given to the resource selector 110 in step 8070. Since the business status is "inquiry", action name "creation of inquiry", business process step "inquiry" and division node "Sales" are given to the resource selector 110.

The operation of the resource selector 110 will be described hereinafter with reference to FIG. 9, (1) The resource selector 110 starts the procedure shown in FIG. 9 when the data is given thereto by the workflow engine 100 in step 8070. The resource selector 110 reads all the records stored in the organization data base 30 and reads all the records stored in the resource selection rule 40 (steps 9000, 9010 and 9020).

(2) The action name, the business process step and the division node give thereto by the workflow engine 100 are compared with the data in the working data base 50 to select a user in step 9030. Selected user name and application name are given to the notifier 120 in step 9040 and then the procedure is ended (steps 9030, 9040 and 9050).

In this procedure, the resource selector 110 reads the organization data base 30 shown in FIG. 5 in step 9010, reads the resource selection rule 40 in step 9020 and selects the user in step 9030. Since the data received from the workflow engine 100 represents business step "inquiry" and division node "sales", reference is made in step 9030 to other data stored in the working data base 50 to select "Sales Section 1" of "Retail Sales Department" included in the organization data base 30, and person "A" in charge of business process step "inquiry" for the division node "Sales Section 1" included in the resource selection rule 40, and information about the selected data, and application name "creation of inquiry" are given to the notifier 120 in step 9040.

The notifier 120 gives the application name to the in-box for the user selected by the resource selector 110. In this case, application name "creation of inquiry" is written to the in-box of the person "A".

The workflow management system in the first embodiment shown in FIG. 1 executes the foregoing procedures repeatedly until an external stop instruction is given thereto. Accordingly, the user 140 is able to know the progress, change and status of other business processes.

According to the first embodiment, since the procedures are executed by referring to the data stored in the application data base prepared separately from the data base of the workflow management system, the invention can be combined with the workflow management system without requiring the great modification of the existing application program.

In the procedure carried out by the status watcher 90, the procedure returns to step 7020 to read the data stored in the business status definition 10 if it is decided in step 7030 that any change is not made in the application data base 80. In such a case, it is possible to repeat step 7030 instead of returning to step 7020.

In the foregoing description of the first embodiment, the status watcher 90 repeats the loop for making reference to the application data base 80 as shown in FIG. 7. However, notice of change may be received from the application data base 80 by using the function of a data base management system applied to the application data base.

Description will be made of the operation of the status watcher 90 and the application data base 80 to receive notice of change from the application data base 80 with reference to FIG. 10.

(1) The status watcher 90 starts a procedure shown in FIG. 10 in step 10000, reads attribute names from the business status definition table 10 in step 10010, gives the attribute of the application data base 80 to be monitored to the application data base 80 in step 10020 and ends the procedure in step 10030 (steps 10000, 10010, 10020 and 10030).

(2) The application data base 80 starts a procedure shown in FIG. 10 in step 10100, receives the attribute from the status watcher 90 in step 10110. The application data base 80 makes a query in step 10130 to see if any change is made in the set attribute (steps 10100, 10110, 10120 and 10130).

(3) If the response in step 10130 is affirmative, the business status name and the status of the record are given to the workflow engine 100 in step 10140 (steps 10130 and 10140).

(4) After executing step 10140 or if the response in step 10130 is negative, the procedure returns to step 10120, and then steps 10120 through 10140 are repeated.

To carry out the procedure shown in FIG. 10, the application data base 80 must comprise a data base management system having a function to decide whether or not any change is made in the data base. Generally, processing ability is higher when the function of the data base system is used than when an external program is used, i.e., when the status watcher 90 repeats the loop for finding a change. Therefore, changes in the application data base 80 can efficiently be found in a short time.

When one of a plurality of interdependent business processes is discontinued while the interdependent business processes are being executed simultaneously, users involved in the rest of the business processes are unable to know the discontinuance of the business process and carry out the unnecessary business processes uselessly unless the users are notified of the discontinuance of the business process. The workflow management system in the first embodiment is capable of preventing the execution of useless processes and of properly informing the user of the discontinuance of the business process.

Figure 11:
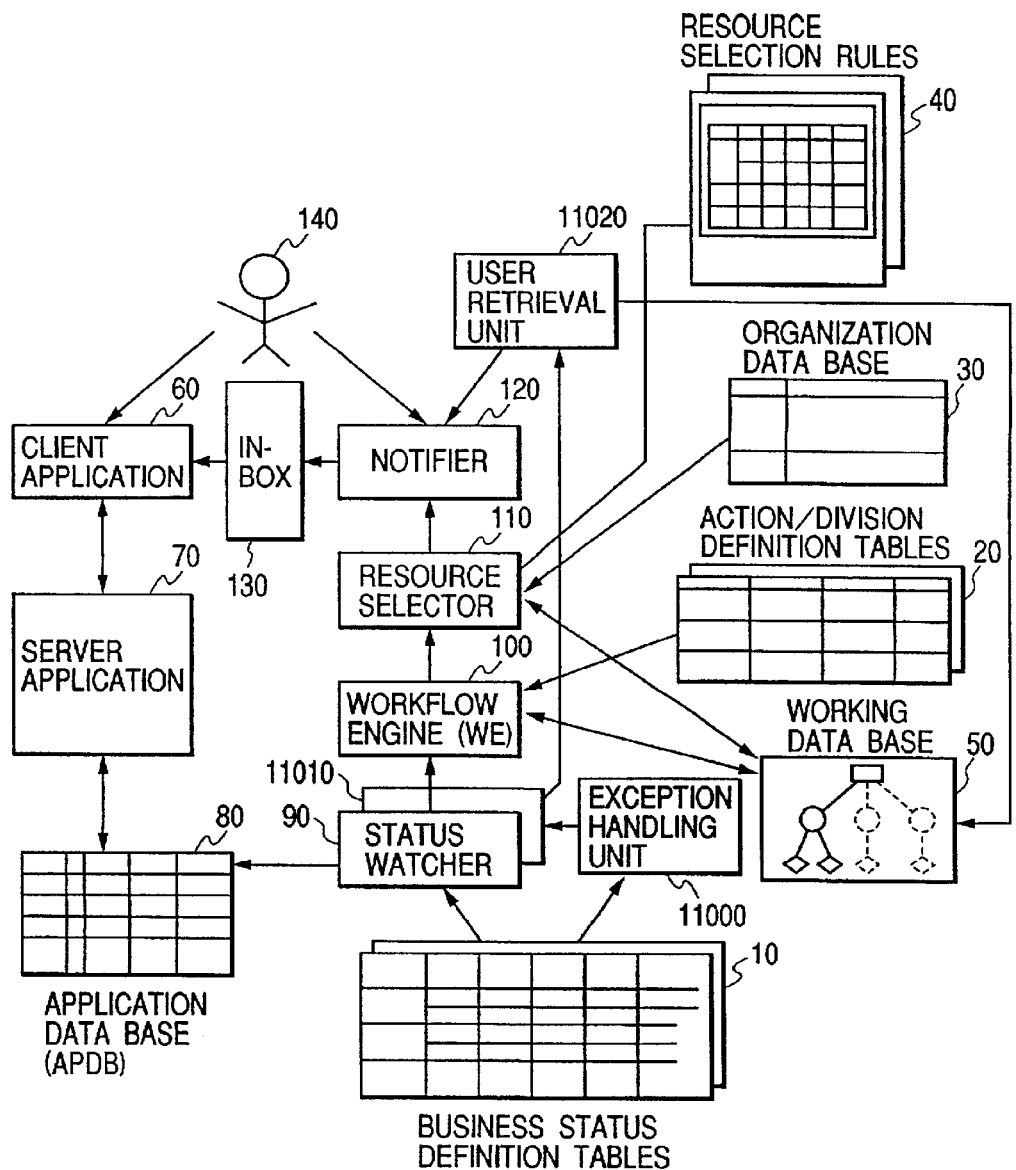
FIG. 11 is a block diagram of a workflow management system in a second embodiment according to the present invention.

FIG. 11 is a block diagram of a workflow management system in a second embodiment according to the present invention, FIG. 12 is a flow chart for explaining the operation of an exception status watcher, FIG. 13 is a view of a business status definition table for explaining the creation of an exception condition, and FIG. 14 is a view of a business status definition table for explaining another example of creation of an exception condition. In FIG. 11, the numeral 11000 represents an exception handling unit, 11010 an exception status watcher and 11020 a user retrieval unit. In FIG. 11, other components like or corresponding to those shown in FIG. 1 are designated by the same reference numerals.

The workflow management system in the second embodiment shown in FIG. 11 is capable of informing users of the interruption of a business process. The workflow management system in the second embodiment comprises, in addition to the components of the workflow management system in the first embodiment shown in FIG. 1, the exception handling unit 11000 which creates the attribute of an exception status from the business status definition table 10, the exception status watcher 11010 which receives the attribute of an exception status from the exception handling unit 11000 and monitors the change of the status of the application data base 80, and the user retrieval unit 11020 which receives the output of the exception status watcher 11010, selects an appropriate user, and gives data to the notifier 120.

A procedure for selecting the attribute to be created by the exception handling unit 11000 will be described with reference to FIG. 13.

An example shown in FIG. 13 has two kinds of business status, namely, "inquiry" and "estimation". Business identification numbers for the two kinds of business status are entered. When either of the two kinds of business status is started, it is highly possible that the other is started. Therefore, it is highly possible that, when one of the two kinds of business status is discontinued, the other is discontinued and hence information must be given to the user to that effect. In such a case, when the business status definition table 10 contains business status of the same starting condition, an exception process is a set condition as the attribute of the starting condition to execute the process properly.

The operation of the exception status watcher 11010 will be described with reference to FIG. 12 on an assumption that the exception handling unit 11000 carries out the procedure previously described with reference to FIG. 13 and creates "business identification number" and "start of estimation" as attributes.

(1) The exception status watcher 11010 starts a procedure shown in FIG. 12 and reads attributer names contained in an exception definition table, not shown, set by the exception handling unit 11000 in step 12010, and sets the attribute of the application data base 80 to be monitored in step 12020.

(2) A query is made in step 12030 to see if any change is made in the attributes set in the application data base 80. If the response in step 12030 is affirmative, a business status name is given to the user retrieval unit 11020 in step 12040.

(3) If the response in step 12030 is negative or after the execution of step 12040, the procedure returns to step 12020 and repeats steps 12020 through 12040.

Upon the reception of the business status name in step 12040, the user retrieval unit 11020 refers to the working data base 50 to select a user executing a business process of the business status, and gives information to the user of the notifier 120 to inform that interruption has occurred.

Suppose, for instance, that a business identification number is entered in the record 2100 of the application data base 80, business processes "inquiry" and "estimation" are started, and the user 140 is obliged by some external cause to delete the business identification number by operating the server application 70 through the client application 60. In this state, in which the attribute "business identification number" is changed, the exception status watcher 11010 gives changed status names "inquiry" and "estimation" to the user retrieval unit 11020.

Then, the user retrieval unit 11020 refers to the working data base 50, selects a user executing the business process of the business status, namely, the user executing "inquiry" and "estimation", and gives information that interruption occurred to the user to the notifier 120.

Although the second embodiment of the present invention has been described as applied to a simple case in which starting conditions are the same, it is possible that one exception process triggers the chained interruption of processes and it is desired in some cases to inform the notifier 120 of the interruption of the processes. In such a case, the exception status watcher 11010 may read attributes created by the business status table 10 and the exception handling unit 11000, and may provide a business status in the completion condition and the start condition are the same.

FIG. 14 shows a business status definition table 10 of assistance in explaining the creation of an exception condition. The creation of an exception condition will be described with reference to FIG. 14.

Referring to FIG. 14, the business status definition table 10 has three kinds of business status "inquiry", "estimation" and "arrangement". The completion condition of "inquiry" and the start condition of "arrangement" are the same in the data of the start of estimation. A business process "arrangement" is started after the completion of a business process "inquiry". If a business process "estimation" is discontinued, it is highly possible that a business process "inquiry" is discontinued, and the discontinuance of the business process "inquiry" invokes the discontinuance of "arrangement".

Accordingly, when the start condition and the completion condition are in the same business status in the business status definition table 10, it is preferable that the exception status watcher 11010 provides business status in which the completion condition and the start condition are the same, in addition to business status in which only the start condition is the same. In the example shown in FIG. 14, the business process "arrangement", as well as business processes "inquiry" and "estimation", is an output of the exception status watcher 11010 in step 12040.

For instance, suppose that a business identification number is entered in the record 2100 of the application data base 80, business processes "inquiry", "estimation" and "arrangement" are started, and the user 140 is obliged by some external cause to delete the business identification number by operating the server application 70 through the client application 60.

Since the attribute "business identification number" is changed, the exception status watcher 11010 gives changed status names "inquiry" and "estimation" to the user retrieval unit 11020, and sends out "arrangement" because the completion condition of "inquiry" and the input condition of "arrangement" are the same.

Although not directly related with the embodiment, it is possible to notify related business indirectly through other business of the interruption of the process.

Figure 15:
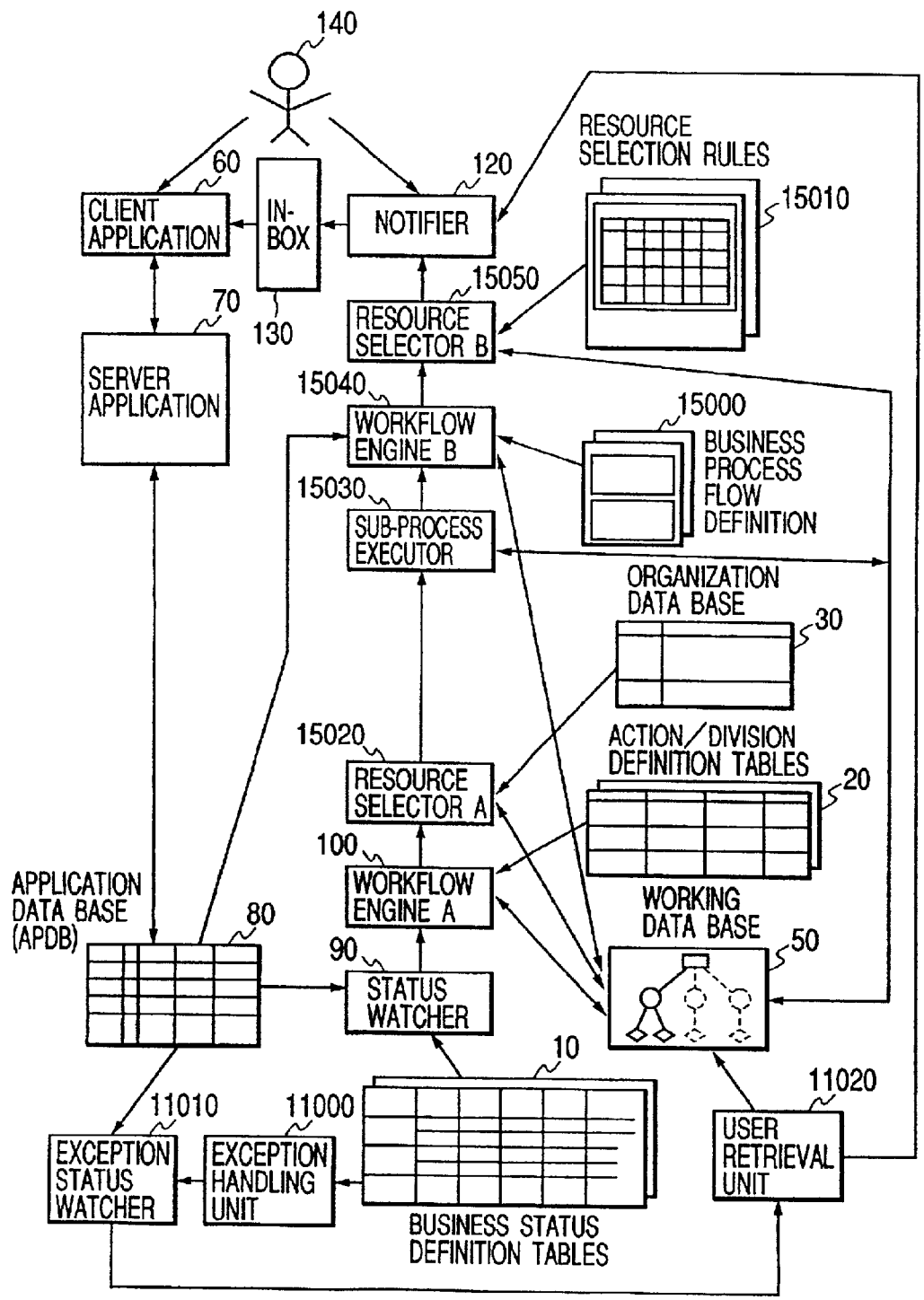
FIG. 15 is a block diagram of a workflow management system in a third embodiment according to the present invention.
Figure 18:
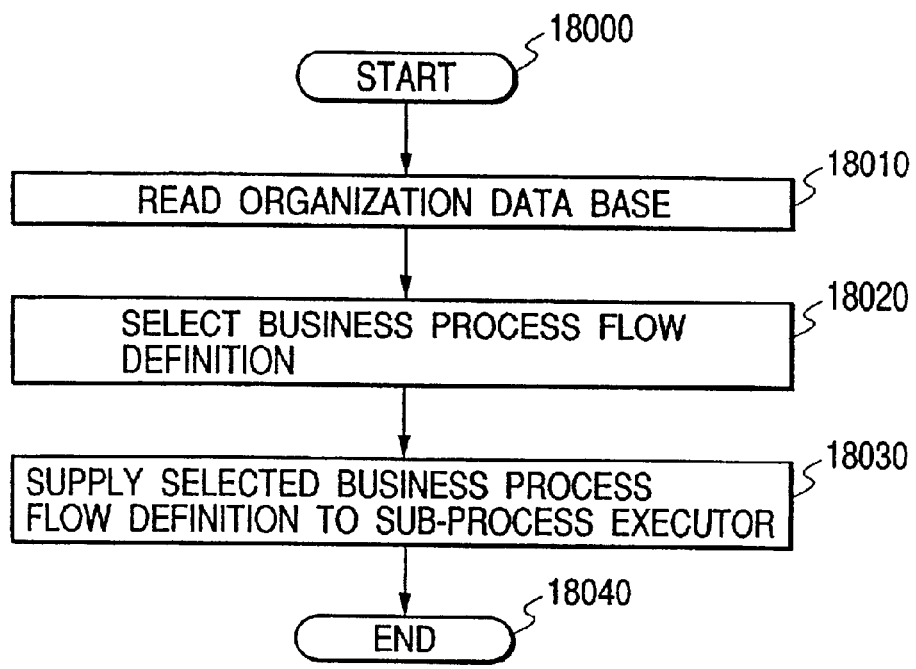
FIG. 18 is a flow chart for explaining the operation of a resource selector A.
Figure 19:
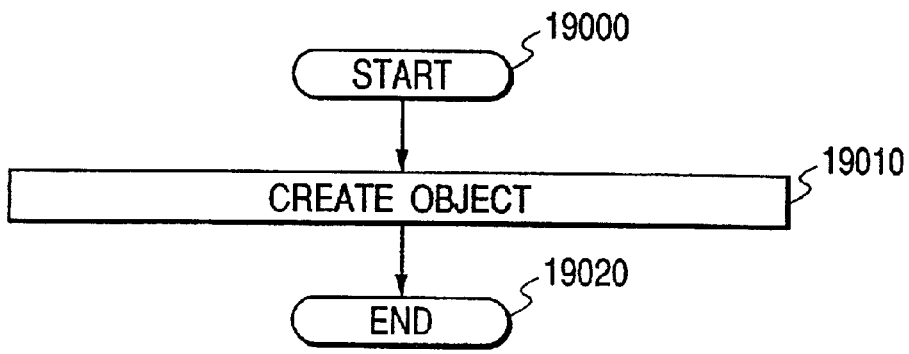
FIG. 19 is a flow chart for explaining the operation of a sub-process executor.
Figure 20:
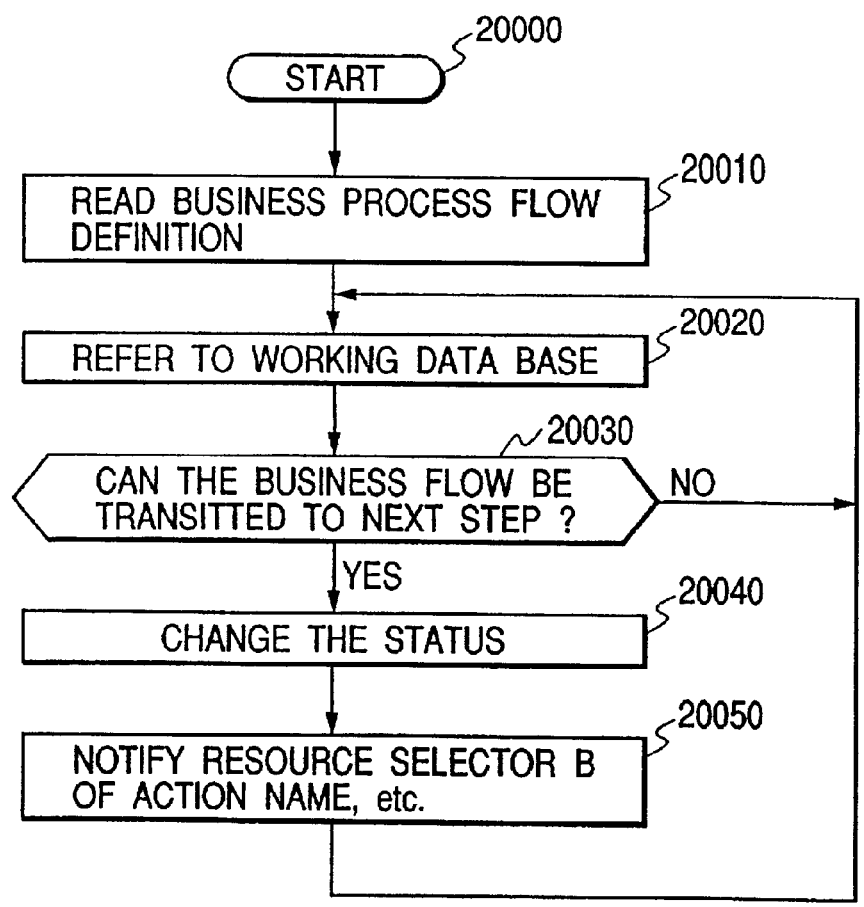
FIG. 20 is a flow chart for explaining the operation of a workflow engine B.
Figure 21:
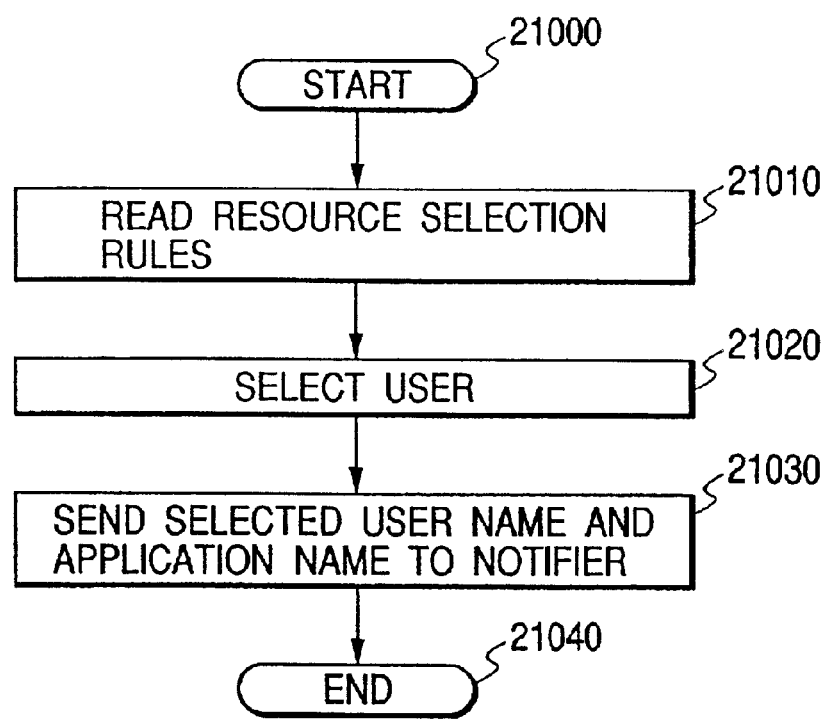
FIG. 21 is a flow chart for explaining the operation of a resource selector B.

FIG. 15 is a block diagram of a workflow management system in a third embodiment according to the present invention, FIG. 16 is a view for explaining the detail of a business process flow definition, FIG. 17 is a view for explaining the detail of a resource selection rule, FIG. 18 is a flow chart for explaining the operation of a resource selector A, FIG. 19 is a flow chart for explaining the operation of a sub-process executor, FIG. 20 is a flow chart for explaining the operation of a workflow engine B and FIG. 21 is a flow chart for explaining the operation a resource selector B.

In FIG. 15, the numeral 15000 represents a division process flow definition, 1510 a resource selection rule, 15020 a resource selector A, 15-30 a sub-process executor, 15040 a workflow engine B, and 15050 a resource selector B. In FIG. 15, other components like or corresponding to those shown in FIGS. 1 and 11 are designated by the same reference numerals.

The workflow management system in the third embodiment is capable of selectively using a business process not having any predetermined procedure, and a business process having a predetermined procedure. The workflow management system in the third embodiment comprises, in addition to the components of the workflow management system previously described with reference to FIG. 11, the division process flow definition 15000 which describes the procedures of business processes in division nodes, the resource selection rule 15010 which determines the relation among the combination of division and business processing step, position, resource selection condition and person, the resource selector A 15020 which receives the output of the workflow engine 100, refers to the working data base 50, the action/division definition table 20 and the organization data base 30 to select a sub-process, the sub-process executor 15030 which creates an object of a sub-process in the working data base 50, the workflow engine B 15040 which refers to the division process flow definition 15000 and gives an object of the working data base 50 to the resource selector B 15050, and the resource selector B 15050 which receives the output of the workflow engine B 15040, refers to the working data base 50 and the resource selection rule 15010 to select a user.

In FIG. 16 showing the business process flow definition 15000, indicated at 16000 and 16010 are business process flows in Sales Sections 1 and 2, respectively. Each of the business flows has a storage region 16020 for storing an estimation procedure. A process flow formed by icons 16030, 16040 and 16050 respectively representing person in charge, chief and manager, connected by arrows is stored in the storage region 16020. The process flow indicates that users in the positions indicated by the icons execute the business process in order indicated by the arrows.

In FIG. 17 showing the resource selection rule 15010, indicated at 17000 and 17010 are resource selection rules for Sales Sections 1 and 2. Each of the resource selection rules 17000 and 17010 has a storage region 17020 for storing a resource selection rule for business process step "estimation". A record 17060 including position 17030, resource selection condition 17040 and attribute of person in charge 17050 is stored in the storage region 17020.

The operations of the processing units shown in FIG. 15 will be described hereinafter with reference to FIGS. 18 to 21. The operations of the status watcher 90, the workflow engine A 100, the exception handling unit 11000, the exception status watcher 11010 and the user retrieval unit 11020 are the same as those of the corresponding components of the foregoing embodiments, respectively, and hence the description thereof will be omitted.

The operation of the resource selector A 15020 will be described first with reference to FIG. 18.

(1) The resource selector A 15020 starts a procedure shown in FIG. 18 in step 18000 and reads all the records stored in the organization data base 30 in step 18010 (steps 18000 and 18010).

(2) The resource selector A 15020 compares an action name, a business process step and a division node with data in the working data base 50 to select a business process flow definition for the division node in step 18020, gives the selected business process flow definition to the sub-process executor 15030 in step 18030 and ends the process instep 18040 (steps 18020, 18030 and 18040).

Suppose that the operation of the workflow engine 100 is the same as that of the workflow engine 100 of the first embodiment, and data representing division node "Sales Section 1", business process step "inquiry" and action name "creation of inquiry" is given to the resource selector A 15020.

Then, the resource selector A 15020 compares these received data and data in the working data base 50 in step 18020, selects the business process flow definition 16020 representing division node "Sales Section 1" and business process step "inquiry" from the business process flow definition 15000 and gives the same to the sub-process executor 15030.

The sub-process executor 15030 starts a procedure shown in FIG. 19 in step 19000, creates an object for storing data necessary for carrying out a sub-process in the working data base 50 in step 19010 and ends the procedure in step 19020 (steps 19000, 19010 and 19020). In this case, the business process flow definition 16020 is a sub-process and an object for storing data necessary for executing the sub-process is created.

The operation of the workflow engine B 15040 will be described with reference to FIG. 20.

(1) The workflow engine B 15040 starts a procedure shown in FIG. 20 in step 20000. The workflow engine B 15040 reads all the records stored in the business flow process definition 15000 in step 20010 and refers to data in the working data base 50 in step 20020 (steps 20000, 20010 and 20020).

(2) A query is made in step 20030 to see if the transition of the flow is possible, i.e., if the business can be moved to the next position. If the response in step 20030 is negative, the procedure returns to step 20020 to repeat the above steps.

(3) If the response in step 20030 is affirmative, the data in the working data base 50 is changed in step 20040, and an action name, a division node, a position and a business process step are given to the resource selector B 15050 in step 20050, and then the procedure returns to step 20020 to repeat the above steps (steps 20040 and 20050).

Suppose that the workflow engine B 15040 reads all the records contained in the business process flow definition 15000 shown in FIG. 16 and refers to data in the working data base 50 instep 20020, it is decided instep 20030 that the transition of the flow is possible, i.e., the business can be moved to the next position, and the flow is moved to "person in charge" indicated by the icon 16030. Then, workflow engine B 15040 changes the data contained in the working data base 50 in step 20040, and gives the action name "creation of inquiry", the division node "Sales Section 1", the position "person in charge" and the business process step "inquiry" to the resource selector B 15050.

The operation of the resource selector B 15050 will be described hereinafter with reference to FIG. 21.

(1) The resource selector B 15050 starts a procedure shown in FIG. 21 in step 21000 and reads all the records stored in the resource selection rule 15010 in step 21010 (steps 21000 and 21010).

(2) The records read out from the resource selection rule 15010 are compared with the data contained in the working data base 50 to select a user in step 21020. A user name of the selected user and an application name are given to the notifier 120 in step 21030 and the procedure is ended instep 21040 (steps 21020, 21030 and 21040).

In this procedure, records stored in the resource selection rule 15010 shown in FIG. 17 are read in step 21010, the user "A" is selected on the basis of the action name "creation of inquiry", the division node "Sales Section 1", the position "person in charge", the business process step "inquiry" and other data contained in the working data base 50 in step 21020, and the user "A" and the application name "creation of inquiry" are given to the notifier 120.

Suppose that the exception handling unit 11000 has carried out the procedure previously describe with reference to FIG. 13 and has created "business identification number" and "start of estimation", the business identification number is entered as the record 2100 of the application data base 80, business process steps "inquiry", "estimation" and "arrangement" have been started, and the user 140 is obliged by some external cause to delete the business identification number by operating the server application 70 through the client application 60 by the user 140 while the business process step "estimation" is in process.

Then, since the attribute "business identification number" is changed, the exception status watcher 11010 gives a changed status names "inquiry", "estimation" and "arrangement" to the user retrieval unit 11020.

Subsequently, the user retrieval unit 11020 refers to the working data base 50 selects users carrying out the business process steps of the business status, i.e., the users carrying out "inquiry", "estimation" and "arrangement", and gives information to the notifier 120 to inform that interruption has occurred in the selected users.

The workflow management system in the third embodiment shown in FIG. 15 repeats the foregoing procedures until an external stop command is given thereto.

The workflow management system in the third embodiment selects the business process flow definition describing the business process defined by the predetermined procedure instead of selecting a user on the basis of the output of the workflow engine which carries out a business process not defined by any predetermined procedure and is capable of realizing the same by the other workflow engine. Therefore, procedures for all the business process flows need not previously be determined, and an appropriate business process flow definition can be selected according to the data stored in the working data base and the application data base when executing a business process.

Although the operation of the foregoing embodiment has been described on an assumption that one business status is discontinued, the present invention may refer to the data contained in the application data base and, when a predetermined term expires, may inform the user of the expiration of the term.

In the workflow management system in the first embodiment according to the present invention, the workflow engine, which refers to the business process definition describing business processes and controls order of applications to be started, uses the data supplied from the status watcher which refers to the data stored in the application data base other than the data base included in the workflow management system. Therefore, the function of the present invention can be incorporated with the workflow management system without requiring the great modification of the existing application program.

The workflow management system in the second embodiment according to the present invention carries out an extracting procedure for extracting an exception condition from conditions set in the status watcher, and a procedure for referring to the application data base and, when a change meeting predetermined exception conditions is made, informing the user of the change. Therefore, if one of a plurality of interdependent business processes is discontinued while the plurality of interdependent business processes are being executed simultaneously, the appropriate users executing other business processes can be informed of the discontinuance of the business process.

The workflow management system in the third embodiment according to the present invention selects the business process flow definition describing the business process defined by the predetermined procedure instead of selecting a user on the basis of the output of the workflow engine which carries out a business process not defined by any predetermined procedure and is capable of realizing the same by the other workflow engine. Therefore, procedures for all the business process flows need not previously be determined, and an appropriate business process flow definition can be selected according to the data stored in the working data base and the application data base when executing a business process.

As apparent from the foregoing description, according to the present invention, if one of a plurality of interdependent business processes is discontinued while the plurality of interdependent business processes are being executed simultaneously, it is possible to inform the appropriate users executing other business processes of the interruption of the business process and, consequently, the users can be prevented from executing useless business processes.

What is claimed is:

1. A workflow control method in a workflow system connected to a plurality of client computers for carrying out business procedures each comprising a plurality of related business processes, at least one of the business procedures being allowed to execute some of the related business processes concurrently, said workflow control method comprising the steps of:

previously defining in a definition table a start condition and a completion condition for each business process and an abnormal status change to be detected in related business processes capable of being executed concurrently with each other by said client computers;

detecting an occurrence of said abnormal status change in one of the plurality of related business processes based on said definition table;

selecting at least one user who has been already ordered to execute an interdependent business process having a start condition identical to that of the business process in which the abnormal status change was detected or to a completion condition of a business process executed concurrently with the business process in which said abnormal status change was detected; and notifying a client computer corresponding to the selected user of the occurrence of abnormality in the related business process so as to prevent the selected user from completing the interdependent business process.

2. The workflow control method according to claim 1, wherein the abnormal status change in one of the business processes to be detected includes a discontinuance of the one of the business processes.

3. The workflow control method according to claim 1, wherein the selection of at least one user is carried out by referring rules defining the relation between predetermined business procedures and related client computers.

4. A workflow system connected to a plurality of client computers for executing business procedures each including a plurality of related business processes, at least one of the business procedures being allowed to execute some of the related business processes concurrently, comprising:

a definition table for defining a start condition and a completion condition for each business process and an abnormal status change to be detected in related business processes capable of being executed concurrently;

a status watcher for detecting a status change in a business process being executed, including an occurrence of an abnormal status change defined in said definition table;

a workflow engine connected to the status watcher, for controlling the execution of each of the business procedures based on the status change detected by the status watcher and predetermined business procedure definitions; and a notifier for notifying at least one of the client computers of the occurrence of the abnormal status change detected by the status watcher, when the user of the client computer has been already ordered to execute an interdependent business process having a start condition identical to that of the business process in which the abnormal status change was detected or to a completion condition of a business process executed concurrently with the business process in which the abnormal status change was detected, so as to prevent the user from completing the interdependent business process.

5. The workflow system according to claim 4, wherein the status watcher detects a discontinuance of the business process as said abnormal status change.

6. The workflow system according to claim 4, further comprising a resource selector for receiving an instruction and an identifier of the business process on which the abnormal status change was detected from the workflow engine, and selecting the client computer to be notified of said abnormal status change by referring predetermined rules previously defining the relation between predetermined business procedures and client computers, thereby to designate the client computer to said notifier.

7. The workflow system according to claim 6, wherein the status watcher, the workflow engine, the notifier and the resource selector are individual programs executed concurrently to control the execution of each of the business procedures.

8. The workflow system according to claim 6, further comprising:

an exception handler unit for creating attributes to handle the abnormal status change detected by the status watcher; and a user retrieval unit for selecting the user of the client computer in charge of a business process interdependent to the business process in which the abnormal status change was detected by the status watcher.

9. A storage medium comprising instructions that, when executed by a computer, perform a workflow control method in a workflow system connected to a plurality of client computers for carrying out business procedures each comprising a plurality of related business processes, at least one of the business procedures being allowed to execute some of the related business processes concurrently, said workflow control method comprising:

previously defining in a definition table a start condition and a completion condition for each business process and an abnormal status change to be detected in related business processes capable of being executed concurrently with each other by the client computers;

detecting an occurrence of said abnormal status change in one of the plurality of related business processes based on said definition table;

selecting at least one user who has been already ordered to execute an interdependent business process having a start condition identical to that of the business process in which the abnormal status change was detected or to a completion condition of a business process executed concurrently with the business process in which said abnormal status change was detected; and notifying a client computer corresponding to the selected user of the occurrence of abnormality in the related business process so as to prevent the selected user from completing the interdependent business process.

10. A workflow management system for controlling an order of execution of business procedures each including a plurality of related business processes and at least one business procedure being allowed to execute some of the related business processes concurrently, said workflow management system comprising:

a client application to be executed by one or more client computers;

a server application to be executed by a server computer for communicating with the client application;

an application database for storing data for the server application;

a definition table for defining a start condition and a completion condition for each business process and abnormal status changes including a discontinuance in a business process to be detected in related business processes capable of being executed concurrently;

a status watcher for detecting a status change in a business process being stored in the application database, including an occurrence of an abnormal status change defined in said definition table;

a workflow engine for controlling the execution of each of the business procedures based on the status change detected by the status watcher and predetermined business procedure definitions; and a notifier for notifying the occurrence of a discontinuance in the business process to at least one of the client computers, when a user of the at least one client computer has been already ordered to execute an interdependent business process having a start condition identical to that of the business process in which the discontinuance was detected or to a completion condition of a business process executed concurrently with the business process in which the abnormal status change was detected, so as to prevent the user from completing the interdependent business process.

11. The workflow management system according to claim 10, further comprising a resource selector for receiving an instruction and an identifier of the business process on which the discontinuance was detected from the workflow engine, and selecting the client computer to be notified of the discontinuance by referring predetermined rules previously defining the relation between predetermined business procedures and client computers.

12. The workflow management system according to claim 10, wherein the status watcher, the workflow engine, the notifier and the resource selector are individual programs executed concurrently to control the execution of each of the business procedures.

13. The workflow management system according to claim 10, further comprising:

an exception handler unit for creating attributes to handle the discontinuance of the business process detected by the status watcher; and a user retrieval unit for selecting the user of the client computer who has been already ordered to execute a business process interdependent to the business process in which the discontinuance was detected by the status watcher.

14. The workflow management system according to claim 13, wherein the user selection is made by referring rules defining the relation between predetermined business procedures and client computers.

15. A workflow management system connected to a plurality of client computers for controlling an order of execution of business procedures each including a plurality of related business processes and at least one business procedure being allowed to execute some of the related business processes concurrently, said workflow management system comprising:

means for defining a start condition and a completion condition for each business process and abnormal status changes including a discontinuance in a business process to be detected in related business processes capable of being executed concurrently with each other by the client computers;

a status watcher configured to detect a status change in a business process being executed, including an occurrence of a discontinuance in a business process defined as an abnormal status change;

a workflow engine configured to control the execution of each of the business procedures based on the status change detected by the status watcher and predetermined business procedure definitions; and a notifier configured to notify the occurrence of a discontinuance in the business process to at least one of the client computers, when a user of the at least one client computer has been already ordered to execute an interdependent business process having a start condition identical to that of the business process in which the discontinuance was detected or to a completion condition of a business process executed concurrently with the business process in which the abnormal status change was detected, so as to prevent the user from completing the interdependent business process.

16. The workflow management system according to claim 15, further comprising a resource selector configured to receive an instruction and an identifier of the business process on which the discontinuance was detected from the workflow engine, and select the client computer to be notified of the discontinuance by referring predetermined rules previously defining the relation between predetermined business procedures and client computers.

17. The workflow management system according to claim 16, wherein the status watcher, the workflow engine, the notifier and the resource selector are individual programs executed concurrently to control the execution of each of the business procedures.

18. The workflow management system according to claim 15, further comprising:

an exception handler unit configured to create attributes to handle the discontinuance of the business process detected by the status watcher; and a user retrieval unit configured to select the user of the client computer who has been already ordered to execute a business process interdependent to the business process in which the discontinuance was detected by the status watcher.

* * * * *